United States Patent [19]
Clites

[11] Patent Number: 4,695,041
[45] Date of Patent: Sep. 22, 1987

[54] CUTTING TORCH HOLDER

[76] Inventor: James L. Clites, 10670 LaCienega, #B, Inglewood, Calif. 90304

[21] Appl. No.: 796,247

[22] Filed: Nov. 8, 1985

[51] Int. Cl.[4] .............................................. B23K 7/10
[52] U.S. Cl. ...................................... 266/66; 266/67; 266/68; 266/69; 266/70; 266/76; 266/77
[58] Field of Search ....................... 266/66, 70, 67–69, 266/71, 76, 77, 48

[56] References Cited

U.S. PATENT DOCUMENTS

| | | | |
|---|---|---|---|
| 1,139,048 | 10/1912 | Messer | 266/66 |
| 2,170,305 | 8/1939 | Ingwersen | 266/70 |
| 3,170,015 | 2/1965 | Ziebart | 266/70 |
| 3,514,087 | 5/1970 | Richards | 266/70 |
| 4,405,117 | 9/1983 | Ohlaug | 266/66 |

Primary Examiner—Wayland Stallard
Attorney, Agent, or Firm—John J. Posta, Jr.

[57] ABSTRACT

The invention is for an oxy cutting torch holder having a frame with a pair of vertically adjustable posts with bearing wheels at their lower ends. A nozzle-receiving passageway is disposed in the frame with a novel nozzle retaining device. Provision is made for replacement of a post by a transversely extending arm carrying an extension with a pointed end to enable cutting in a circle.

12 Claims, 10 Drawing Figures

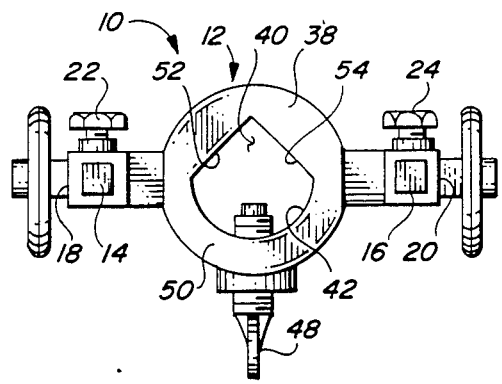
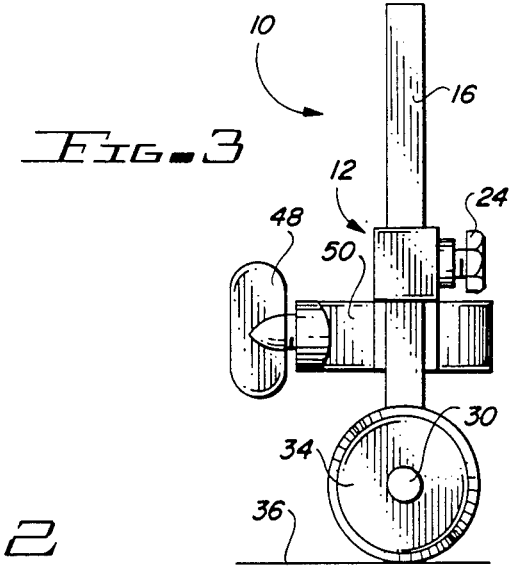
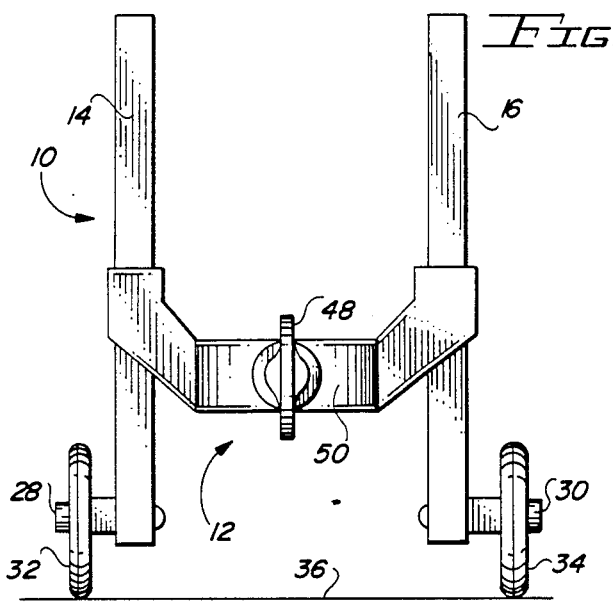
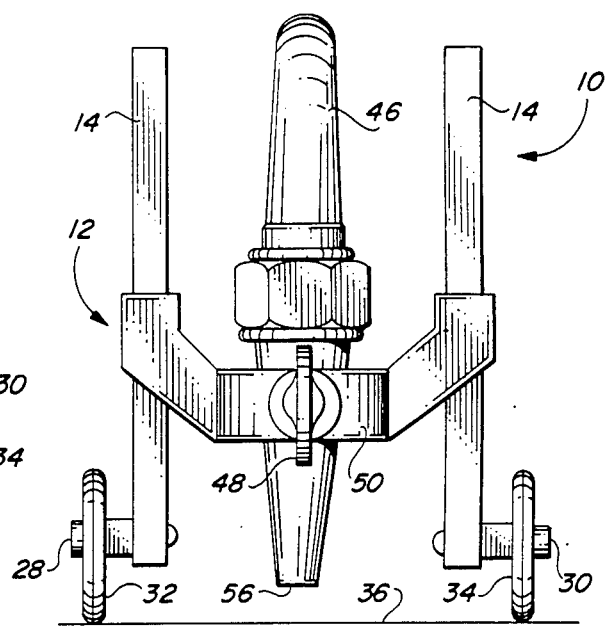
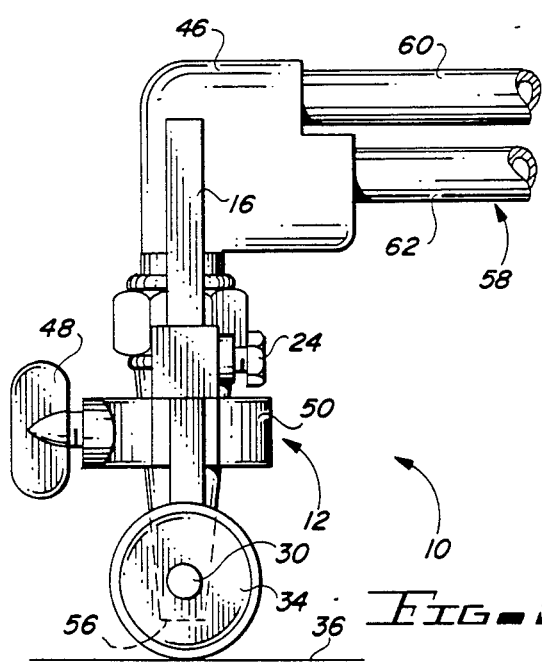
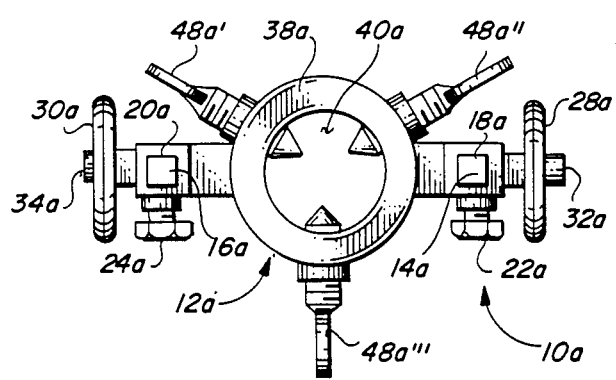

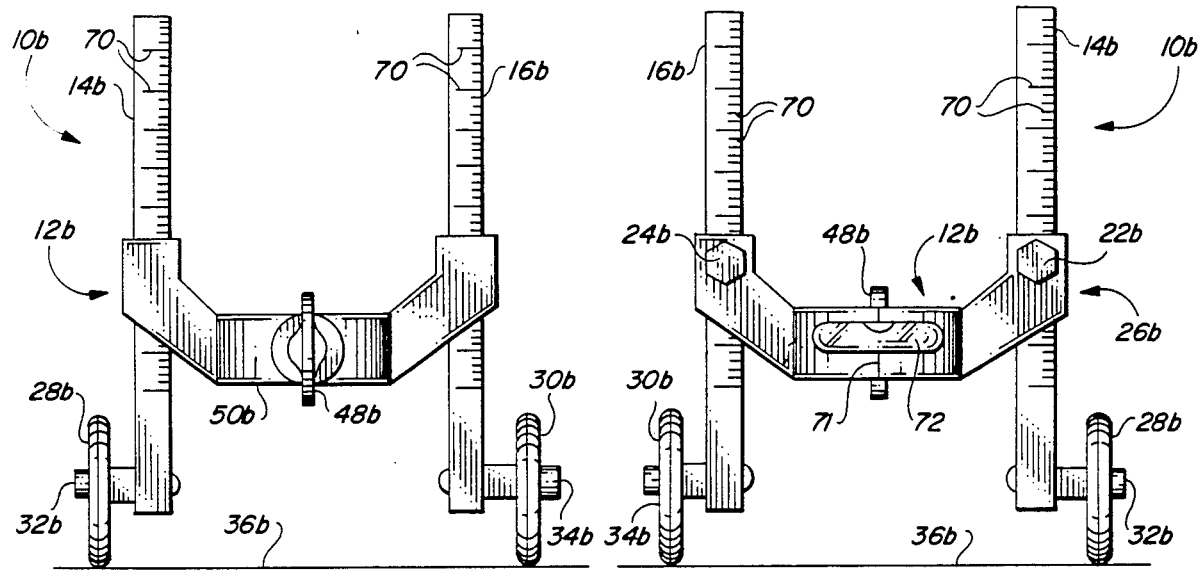
Fig-7　Fig-8
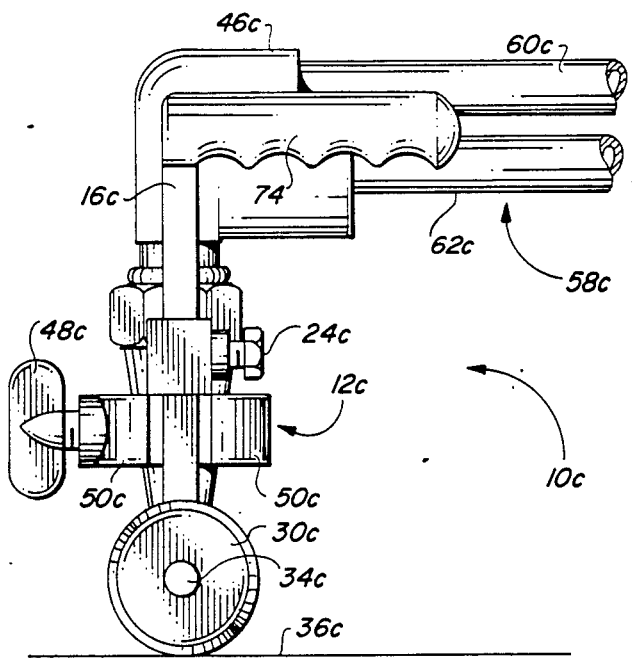
Fig-10　Fig-9
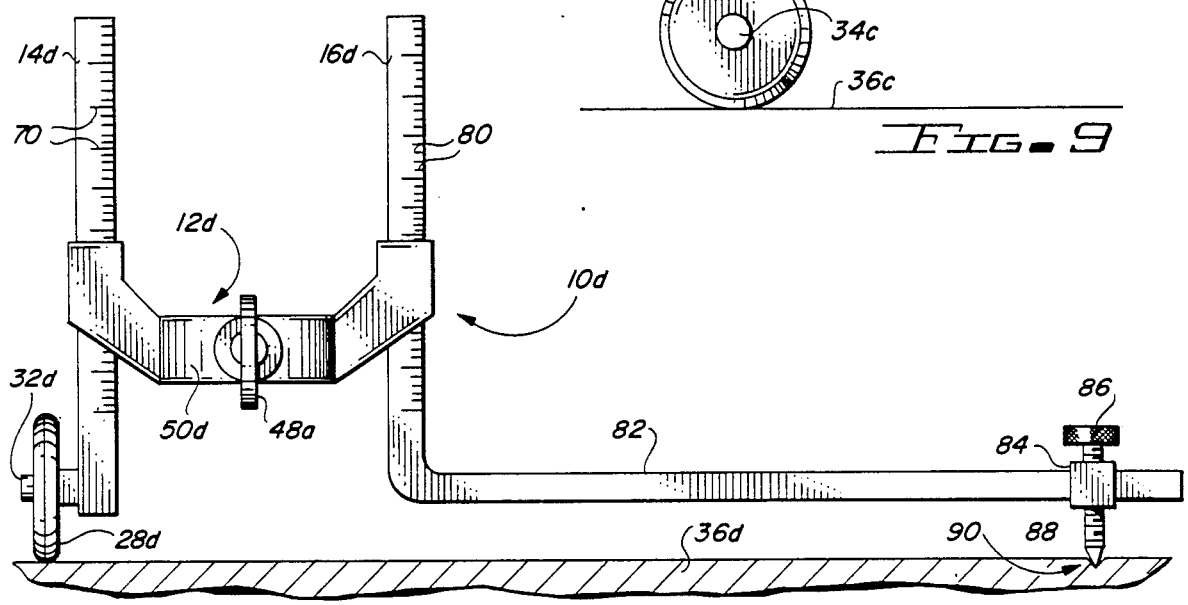

CUTTING TORCH HOLDER

BACKGROUND OF THE INVENTION

1. Field of the Invention

The present invention generally relates to cutting equipment and, more particularly, to an oxy cutting torch holder of an improved type.

2. Prior Art

Various types of holders have been provided for oxy-acetylene and similar types of cutting torches. Certain of such holders employ complicated components which include integral nozzles, valves and supply lines within the holder body (see U.S. Pat. No. 2,886,305), or separate integral cutting and flame nozzles and supply lines (see U.S. Pat. No. 4,344,506). Other torch holders employ expensive, complicated wheeled carriages with turn tables, geared brackets and the like (See U.S. Pat. No. 2,523,237). Simplified torch holders are exemplified by the single wheeled holder of U.S. Pat. No. 4,283,043, which, unfortunately, grips the then gas supply tubes of the torch and not the nozzle and can injure the supply tubes, and by U.S. Pat. No. 4,405,117 which discloses a nozzle holder which, however, has no vertical nozzle adjustment, no nozzle tilt feature, no self-centering or releasable securing components and the like.

There remains a need for an improved simplified wheeled type of cutting torch holder which permits the cutting nozzle to be firmly gripped and maneuvered and to be easily adjusted vertically, as well as tipped or inclined, if desired. Further, it is desirous to have a cutting torch holder which can readily be modified to cut in precise circles.

SUMMARY OF THE INVENTION

The improved cutting torch holder of the present invention satisifes the foregoing needs. The holder is substantially as set forth in the Abstract herein. Thus, the holder comprises a generally horizontally extending frame supported by a pair of vertical posts individually releasably secured to the frame at any desired height and bearing wheels on their lower ends below the frame. A generally vertical nozzle-receiving passageway is disposed in the frame between the posts. Preferably, the passageway has an arcuate or semi-circular side and a wedged-shaped side. A screw is threaded transversely through the frame and into the passageway from the arcuate side to releasably pin a cutting torch nozzle in the passageway, against the wedge-shaped side so that its exit tip is held below the frame a desired distance. If desired, a plurality of such screws can be spaced around and enter the passageway radially. The passageway could also be cylindrical, oval or frusto-conical.

The vertical posts can have horizontal position marks on them to facilitate their alignment with the frame. A bubble level can be provided, also for that purpose, and a vertical mark on the outside of the frame near the passageway can help align a torch nozzle vertically in the passageway, for example, if a plurality of passageway screws are used in place of a single screw and wedge-shaped passageway side configuration. Moreover, horizontal hand grips can be releasably secured to the tops of the posts to facilitate maneuvering of the holder without touching the frame or torch tubes.

If the cutting is to occur at an acute angle to the surface to be traversed by the holder, the two posts can be set at two different heights, in order to cant the torch nozzle over. Alternatively, in the embodiment having a plurality of radiating passageway screws, the nozzle in the passageway can be tilted and adjusted as desired.

If cutting were to be done in a circle pattern, one of the wheeled posts can be replaced by a post having a transversely extending arm which carries an extension with a pointed end, which end is adapted to be inserted into a recess formed in the work-piece and rotated in a circle having a preselected radiu.

Accordingly, the holder is very simple, inexpensive, durable, compact and efficient, providing secure releasable holding of standard oxy-acetylene and other torch nozzles while enabling reproducible adjustments in cutting nozzle heighth and angle for improved results. Further features of the invention will be apparent from the following detailed description and accompanying drawings.

DRAWINGS

FIG. 1 is a schematic top plan view of a first preferred embodiment of the improved cutting torch holder of the present invention;

FIG. 2 is a schematic front elevation of the holder of FIG. 1;

FIG. 3 is a schematic side elevation of the holder of FIG. 1;

FIG. 4 is a schematic front elevation of the holder of FIG. 1, shown with a conventional oxy-acetylene cutting torch nozzle releasably secured therein;

FIG. 5 is a schematic side elevation of the holder of FIG. 1, shown with a conventional oxy-acetylene cutting torch nozzle secured therein and the torch gas supply tubes extending outwardly therefrom;

FIG. 6 is a schematic top plan view of a second preferred embodiment of the improved cutting torch holder of the present invention;

FIG. 7 is a schematic front elevation of a third preferred embodiment of the improved cutting torch holder of the present invention;

FIG. 8 is a schematic rear elevation of the holder of FIG. 7; and,

FIG. 9 is a schematic side elevation of a fourth preferred embodiment of the improved cutting torch holder of the present invention.

FIG. 10 is a schematic side elevation of a fifth preferred embodiment of the improved cutting torch holder of the present invention.

DETAILED DESCRIPTION

FIGS. 1–5

Now referring more particularly to FIGS. 1–3 of the accompanying drawings, a first preferred embodiment of the improved cutting torch holder of the present invention is schematically depicted therein. Thus, holder 10 is shown, which comprises a generally horizontally extending frame 12 supported by a spaced pair of vertical posts 14 and 16 passing through openings 18 and 20 extending vertically through frame 12 peripheral of a central vertical cutting torch nozzle-receiving passageway extending through frame 12.

Posts 14 and 16, and openings 18 and 20 are rectangular as is shown in FIG. 1 to prevent rotation within openings 18 and 20. Posts 14 and 16 are releasably pinned at any desired heighth to frame 12 by bolts 22 and 24 extending through the rear 26 of frame 12 and into openings 18 and 20, respectively, to grip posts 14 and 16, respectively.

The lower ends of posts 14 and 16 have transverse axles 28 and 30 carrying, respectively, rotatable vertical wheels 32 and 34 to support frame above surface 36 and allow holder to smoothly roll thereover.

Frame 12 has an expanded central portion 38 between posts 14 and 16, which portion 38 defines cutting torch nozzle-receiving vertical passageway 40 extending therethrough. Passageway 40 has an arcuate front portion 42 and a wedge-shaped rear portion 44 adapted to securely hold a cutting torch nozzle 46 in a vertical attitude (FIG. 4) when pinned therein by a screw 48 horizontally extending through the front 50 into passageway 40 toward wedge-shaped portion 44. In this regard, portion 44 comprises a pair of converging vertical walls 52 and 54 which meet at the rear center of passageway 40.

When nozzle 46 is inserted down through passageway 40, and screw 48 is turned to cause it to travel toward portion 44, nozzle 46 is securely releasably locked against portion 44 by screw 48, at a desired height in frame 12, so that nozzle exit tip 56 extends below frame 12 and above surface 36 a desired distance for cutting purposes. Vertical alignment of nozzle 46 is assured by walls 52 and 54, so that tip 56 is perpendicular to surface 36.

If it is ever desired to tilt nozzle tip 56 so that it forms an angle of less than 90° with surface 36, one of posts 14 and 16 can be loosened by loosening the associated post bolt, then the loosened post can then be lowered or raised relative to the other posts, then relocked in place by its associated bolt. Holder 10 will then roll over surface 36 tilted at an angle, tip 56 being similarly tilted for cutting at an angle.

It will be seen from FIGS. 4 and 5, holder 10 touches no part of torch 58 except durable nozzle 46, so that gas supply tubes 60 and 62, for example, are not engaged by and cannot be damaged by holder 10, in contrast to certain other holders. Moreover, holder 10 is adjustable to regulate the vertical distance and angle of nozzle tip 56 relative to surface 36, over which holder 10 easily rolls on wheels 32 and 34. Nozzle 46 is securely but releasably locked in place in holder 10 to avoid errors in cutting. Holder 10 is simple, durable, efficient and inexpensive.

FIG. 6

A second preferred embodiment of the improved torch holder of the present invention is schematically depicted in FIG. 6. Thus, holder 10a is shown. Components thereof similar to those of holder 10 bear the same numerals, but are succeeded by the letter "a". Holder 10a is identical to holder 10 in all respects except that passageway 40a is inverted frusto-conical, narrowing downwardly, and three identical spaced screws 48a', 48a" and 48a''' extend radially into passageway 40a in order to releasably pin a cutting torch nozzle (not shown) vertically or in a tilted position at a desired heighth in frame 12a. If desired, passageway 40a could be cylindrical instead of inverted frusto-conical. Holder 10a includes posts 14a and 16a in openings 18a and 20a, bolts 22a and 24a, axles 28a and 30a and wheels 32a and 34a. Holder 10a has substantially similar advantages to holder 10.

FIGS. 7 and 8

A third preferred embodiment of the improved cutting torch holder of the present invention is schematically depicted in FIGS. 7 and 8. Thus, holder 10b is shown. Components thereof similar to those of holder 10 or 10a bear the same numerals, but are succeeded by the letter "b". Holder 10b is identical to holder 10 except that it includes horizontal marks or indentations 70 in posts 14b and 16b to facilitate their positioning relative to frame 12b and thus control the desired alignment of a nozzle (not shown) when carried in frame 12b.

Moreover, a vertical mark or indentation 71 is disposed in the outside of rear 26b of frame 12b in line with the central passageway therein to aid in aligning a nozzle in the vertical position in the passageway. Posts 14b and 16b are connected through axles 28b and 30b to wheels 32b and 34b, as shown. Rear 26b of frame 12b may include a horizontal bubble level 72 as an added alignment guide. Holder 10b has substantially the advantages of holder 10.

FIG. 9

A fourth preferred embodiment of the improved cutting torch holder of the present invention is schematically depicted in FIG. 9. Thus, holder 10c is shown. Components thereof similar to those of holder 10 bear the same numerals, but are succeeded by the letter "c".

Holder 10c is identical to holder 10 except that the tops of the vertical posts thereof (post 16c is shown) are fitted with removable horizontal handles 74 extending towards and parallel to tubes 60c and 62c of torch 58c for easy maneuvering of holder 10c. Nozzle 46c is shown releasably secured in frame 12c of holder 10c, with frame 12c being held above surface 36c by the post 16c and its companion post (not shown), and interconnected wheel 34c and its companion wheel (not shown). Holder 10c has substantially the advantages of holder 10. Other advantages of holders 10, 10a, 10b and 10c are set forth in the foregoing.

FIG. 10

A fifth preferred embodiment of the torch holder of the present invention is schematically depicted in FIG. 10. Thus, holder 10d is shown. Components thereof similar to those of holder 10 bear the same numerals, but are succeeded by the letter "d".

Holder 10d is identical to holder 10 except that post 16d is provided which does not have a wheel secured to the lower end thereof. Instead, an extension 82 runs from the lower end of post 16d, said extension 82 slideably carrying thereon a releasable clamp 84 having a screw means 86 for locking clamp 84 in a preselected position on extension 82. Clamp 84 has a depending pointed post 88 secured thereto which is adapted to be placed in an opening 90 in a work-piece 36d.

In operation, torch holder 10d is rotated about opening 90 to cut a circular pattern in work-piece 36d, with the radius thereof being determined by the position of clamp 84 on extension 82.

Various modifications, changes, alterations and additions can be made in the improved cutting torch holding of the present invention, its components and their parameters. All such changes, modifications, alterations and additions as are within the scope of the appended claims form part of the present invention.

What is claimed is:

1. An improved cutting torch holder, said holder comprising, in combination:
(a) a frame adapted to releasably receive and retain the nozzle of a cutting torch, said frame including:
(1) a central portion defining a vertically extending passageway adapted to receive said nozzle,
(2) said passageway being configured so as to wedge said nozzle in a predetermined position,
(3) at least one set screw carried by said central portion for securing said nozzle in said predetermined position, said set screw having a portion thereof extending along a horizontal line into said passageway, (4) said central portion having a plurality of extensions integral with said central portion and radiating therefrom,
  (i) each of said extensions having a vertically extending post-receiving opening therein,
  (ii) each said opening being dimensioned so as to prevent rotation of a post therein,
  (iii) at least one set screw carried by each of said extensions for securing a post within the opening in each said extension, and (b) height adjustment means secured to said frame, comprising
  (1) a plurality of posts for supporting said frame at at predetermined height,
    (i) each said post having marker means thereon for effecting an alignment of said frame,
    (ii) said marker means including a plurality of horizontal lines extending along the length of each post,
    (iii) at least one set screw carried by each of said extensions for securing a post within the opening in each said extension, and (c) roller means secured to at least one of said posts adjacent the lower end thereof below said frame, whereby said frame can readily be moved along a surface to effect controlled travel of a cutting torch which is carried by said frame and maintained at a predetermined distance above said surface.

2. The improved torch holder of claim 1, wherein rollers are secured to both of said posts, and wherein said rollers are wheels, the main axes of which are generally vertical and which wheels are parallel to said posts, and wherein horizontal axles releasably connect said sheels to said posts for removal, repair and replacement of said wheels.

3. The improved torch holder of claim 1 wherein said hand grip means include generally horizontally extending arms releasably connected to said posts.

4. The improved torch holder of claim 1 wherein one of said posts carries a support member extending a distance from said frame, and a clamp means slideably positioned on said support member, said clamp means having releasable locking means and a locating member attached thereto.

5. The improved cutting torch holder as set forth in claim 1, including alignment means disposed on said central portion to assist in aligning the nozzle in a vertical position.

6. The improved torch holder of claim 1 wherein said passageway narrows vertically and is tapered downwardly to limit the length of torch nozzle extendable therebelow and to provide support for a torch nozzle.

7. The improved torch holder of claim 1 wherein said posts include hand grip means to facilitate maneuvering of said holder and a torch nozzle when held by said holder.

8. The improved torch holder of claim 1 wherein said passageway has a vertically extending arcuate end joined to a vertically extending wedge-shaped end.

9. The improved torch holder of claim 8 wherein said nozzle locking means comprises a screw extending through said frame and into said passageway from said arcuate end toward said wedge-shaped end to securely pin a nozzle in a vertical orientation against said wedge-shaped end, and wherein said wedge-shaped end comprises a pair of converging vertical walls.

10. The improved torch holder of claim 9 wherein said frame includes means for vertically aligning a torch nozzle in said passageway.

11. An improved cutting torch holder, said holder comprising, in combination:

(a) a frame adapted to releasably receive and retain the nozzle of a cutting torch, said frame including:
  (1) a central portion defining a vertically extending passageway adapted to receive said nozzle,
  (2) said passageway being configured so as to wedge said nozzle in a predetermined position,
  (3) at least one set screw carried by said central portion for securing said nozzle in a predetermined position, said set screw having a portion thereof extending along a horizontal line into said passageway,
  (4) said central portion having a plurality of extensions integral with said central portion and radiating therefrom,
    (i) each of said extensions having a vertically extending post-receiving opening therein,
    (ii) each said opening being dimensioned so as to prevent rotation of a post therein,
    (iii) at least one set screw carried by each of said extensions for securing a post within the opening in each said extension, (b) height adjustment means secured to said frame, comprising
  (1) a plurality of posts for supporting said frame at a predetermined height,
    (i) each said post having marker means thereon for effecting an alignment of said frame,
    (ii) said marker means including a plurality of horizontal lines extending along the length of each post,
    (iii) at least one set screw carried by each of said extensions for securing a post within the opening in each said extension, (c) roller means secured to at least one of said posts adjacent the lower end thereof below said frame, whereby said frame can readily be moved along a surface to effect controlled travel of a cutting torch which is carried by said frame and maintained at a predetermined distance above said surface; and (d) a plurality of hand grip means removably secured to the top of each of said posts, said hand grip means enabling a user of the cutting torch holder to accurately move the cutting torch along a path in an accurate manner, without resorting to applying any pressure to the nozzle or any line leading from the nozzle.

12. An improved cutting torch holder, said holder comprising, in combination:

(a) a frame adapted to releasably receive and retain the nozzle of a cutting torch, said frame including:
  (1) a central portion defining a vertically extending passageway adapted to receive said nozzle,
  (2) said passageway being configured so as to wedge said nozzle in a predetermined position,
  (3) at least one set screw carried by said central portion for securing said nozzle in a predetermined position, said set screw having a portion thereof extending along a horizontal line into said passageway, (4) said central portion having a plurality of extensions integral with said central portion and radiating therefrom,
  (i) each of said extensions having a vertically extending post-receiving opening therein,
  (ii) each said opening being dimensioned so as to prevent rotation of a post therein,
  (iii) at least one set screw carried by each of said extensions for securing a post within the opening in each said extension, and
(b) height adjustment means secured to said frame, comprising
  (1) a plurality of posts for supporting said frame at a predetermined height,
    (i) each said post having marker means thereon for effecting an alignment of said frame,
    (ii) said marker means including a plurality of horizontal lines extending along the length of each post,
    (iii) at least one set screw carried by each of said extensions for securing a post within the opening in each said extension,
(c) roller means secured to at least one of said posts adjacent the lower end thereof below said frame, whereby said frame can readily be moved along a surface to effect controlled travel of a cutting torch which is carried by said frame and maintained at a predetermined distance above said surface,
(d) a plurality of hand grip means removably secured to the top of each of said posts, said hand grip means enabling a user of the cutting torch holder to accurately move the cutting torch along a path in an accurate manner, without resorting to applying any pressure to the nozzle or any line leading from the nozzle,
(e) wherein one of said posts has an upwardly extending portion adapted to be releasably secured to the frame and further having a horizontally extending positioning member secured to the lower end of said post, said positioning member being integral with said post and movable therewith vertically; and
(f) a locating member and a clamp means for securing said locating member at a predetermined position along said positioning member, the lower end of said locating member terminating in a point, whereby said frame is adapted to be rotated about the point of contact of the locating member with a surface upon which the cutting torch holder rests.

* * * * *